Oct. 25, 1938.  C. G. MAIER  2,133,997
METHOD OF CONTACTING FINE ORES WITH GASES
Filed June 15, 1937  2 Sheets-Sheet 1
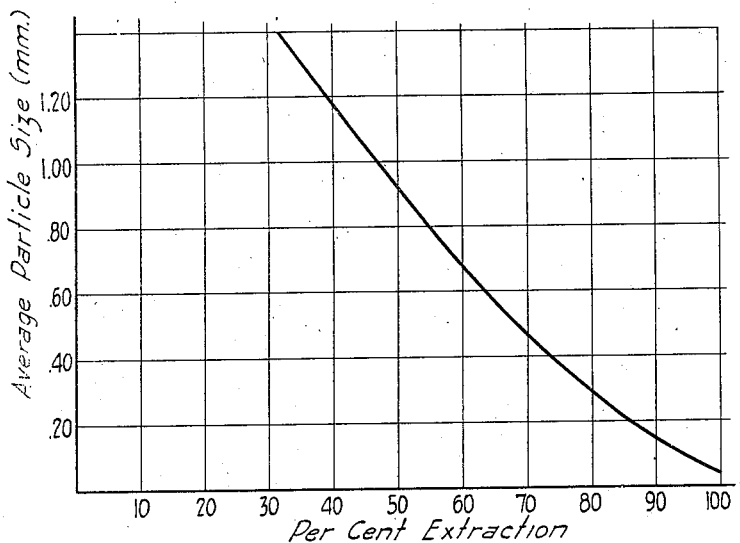
FIG_1_
FIG_2_
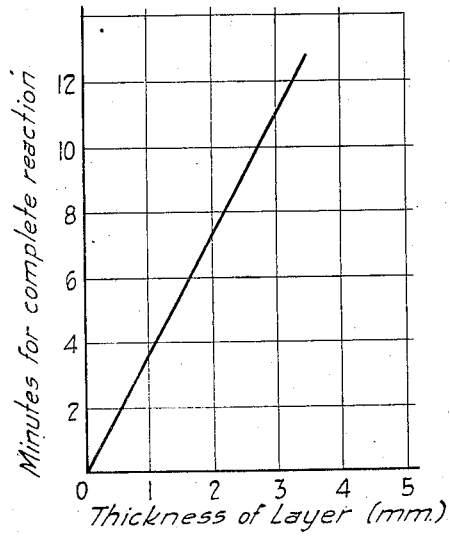
INVENTOR.
Charles G. Maier
BY Robert H. Eckhoff
ATTORNEY.

Oct. 25, 1938.    C. G. MAIER    2,133,997
METHOD OF CONTACTING FINE ORES WITH GASES
Filed June 15, 1937    2 Sheets-Sheet 2
FIG_4_    FIG_3_
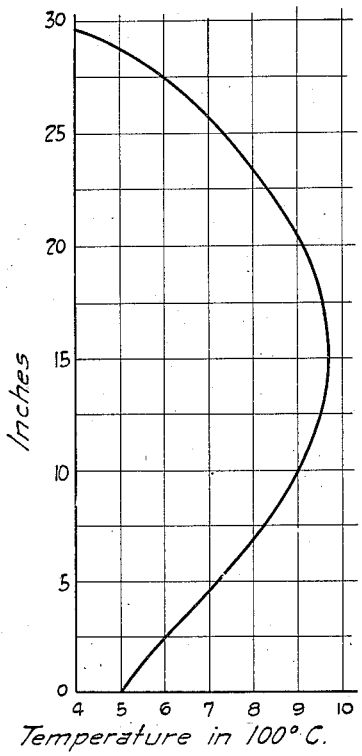
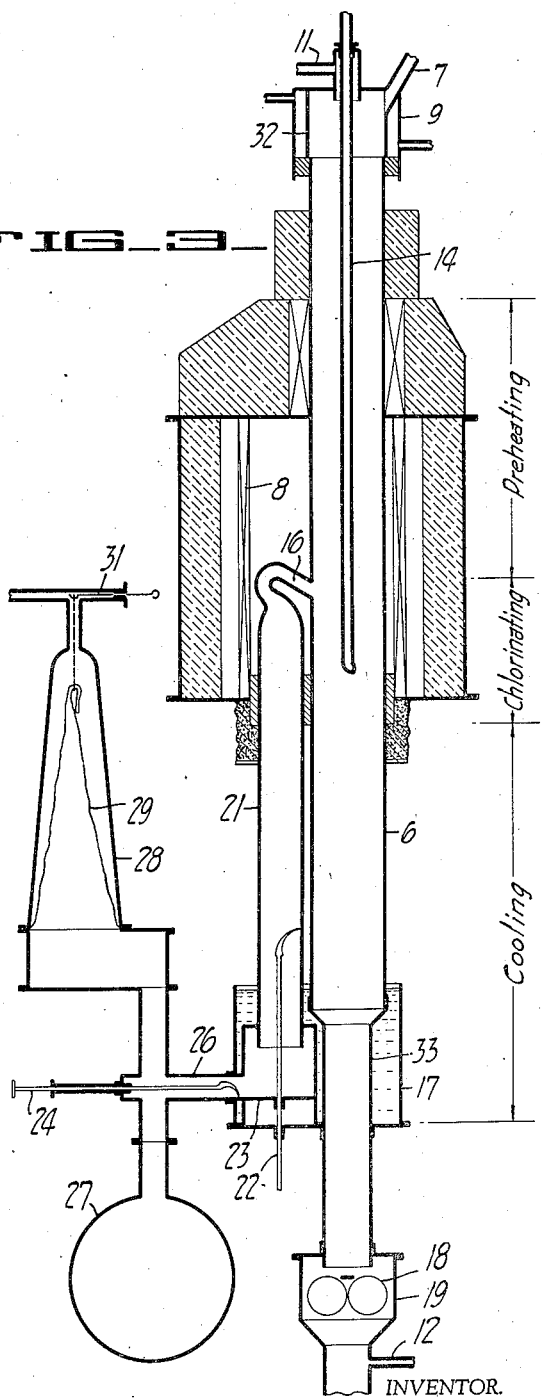
INVENTOR.
Charles G. Maier
BY Robert H. Eckhoff
ATTORNEY.

Patented Oct. 25, 1938

2,133,997

UNITED STATES PATENT OFFICE 2,133,997

METHOD OF CONTACTING FINE ORES WITH GASES

Charles G. Maier, Oakland, Calif., assignor to Great Western Electro-Chemical Company, a corporation of California Application June 15, 1937, Serial No. 148,321

9 Claims. (Cl. 75—112)

This invention relates particularly to the continuous countercurrent chlorination of chromite ores, and broadly to technical processes involving the necessity of contacting finely ground ores with reactant gases under carefully controlled conditions. Thus it may be utilized for chlorinating ores other than chromite, or for such reactions as the reduction of finely ground oxidic ores, for example, an iron oxide, by reducing gases, as hydrogen or reformed natural gas. It specifically applies to reacting fine ores with gases in shaft type furnaces.

While it has long been known that chemical reaction rates between solids and gases were accelerated when the degree of fineness of subdivision of the solid was enhanced, it has heretofore not been possible to carry on such processes directly in shaft furnaces because the presence of appreciable quantities of fine material in such units tends to hinder the permeation of the charge by the gases, and causes such high pressures and relative velocities of gas versus solid to be required that serious dusting problems ensue. In the past it has been necesary either to resort to the sintering of fine ores, as is often done with such ores as iron, lead, and zinc, or else to attempt satisfactory contacting by showering the finely ground ores through an ascending column of gas. The first of these alternatives provides a permeable charge, but the sintering action tends to cause growth of particle size, or even in extreme cases the formation of partially fused particles, and thus prevents the accelerating action of fineness of subdivision to be utilized for chemical or metallurgical purposes. In utilizing the second alternative, a number of practical difficulties develop. Foremost, the dusting problem becomes extremely serious. Further when reactions are to be carried on which entail relatively high temperatures and appreciable reaction times, the transfer of heat to supply possible endothermal requirements of the process becomes difficult, and often impractical. Finally, appreciable contact times can be secured only by building absurdly tall units, or by carefully classifying the ore feed so that it may be accurately held in suspension on the gas stream.

My method allows conventional shaft furnaces to be utilized, while still retaining the advantages of fine subdivision, and at the same time avoiding dusting problems while maintaining high relative velocities of gas versus solid to be treated. It has further advantages in that it permits continuous operation of the countercurrent type even when certain constituents of the ore, or its impurities, are temporarily, or necessarily converted to liquid form.

In a copending application Serial No. 148,322 of June 15, 1937, I have pointed out that the continuous countercurrent chlorination of chromite ores in briquetted or finely ground forms cannot be carried out directly because of side reactions, but I showed continuous countercurrent operation to be feasible if certain physical and chemical conditions of the charge were accurately controlled, and I disclosed there in detail the particular chemical conditions which apply to a chromite ore, an excess of chlorine of from 10%–11% and temperatures between 900° C. and 1100° C. were maintained.

In the present application, I disclose especially the manner in which the physical requirements of continuous countercurrent operation on a chromite ore can be provided in conventional shaft type furnaces. I shall illustrate these requirements and their manner of provision by specific reference to the same ore used in my copending application, which had the following analysis:

| | Per cent |
|---|---|
| $Cr_2O_3$ | 51.6 |
| FeO | 19.6 |
| $SiO_2$ | 5.5 |
| $Al_2O_3$ | 11.8 |
| MgO | 11.5 |
| CaO | 0.8 |
| | 100.8 |

When the attempt is made to chlorinate and sublime such an ore in a continuous countercurrent furnace, it is found that no continuous operation is possible with briquetted or a merely finely ground charge, because certain liquid chlorides which are non-volatile are formed, especially $CrCl_2$, $MgCl_2$, and $CaCl_2$, along with solid $CrCl_3$. In my copending application I have shown that the formation of $CrCl_2$ may be avoided if certain chemical requirements are maintained, specifically an excess of not less than 5.5% free chlorine in the exit gas, and removal of these gases at temperatures of not less than 890° C. It is further found that the primary reaction rate of chlorination is so great at temperatures above 900° C. that it is physically impossible to apply the requisite amounts of chlorine, and to remove the products, when a briquetted charge, or finely ground ore under normal gravitational packing, is fed to the furnace, since the required rates of gas flow would then be so great that excessive pressures in the column would be produced, and the charge forcibly blown from the furnace. When using ores of lower grade than the one specified, where the chlorine requirements are less, I have found still further difficulties in that magnesium chloride, which melts at 712° C., and boils at 1412° C., forms in the liquid state, which not only binds the particles of fine ore together, but also covers them with a film of liquid magnesium chloride. In the case of a briquetted charge this magnesium chloride is drawn into the briquette by capillarity. This accumulation of magnesium chloride almost completely stops the chlorinating action, and results in very low extractions. I have found that chlorine is incapable of penetrating thick films or accumulations of liquid magnesium chloride, and that when this condition can occur, virtually no chlorination is possible.

I have discovered that all these difficulties may be overcome, and fine ores readily and effectively contacted in continuous countercurrent shaft furnaces with reacting gases by disposing finely ground ore, or mixtures of ore with reagent materials, upon the surface of inert carrier particles of such gross subdivision that a permeable charge is maintained in the form of a semipermanent film or coating of definitely controlled or limited thickness.

In the drawings accompanying and forming a part hereof, Figure 1 shows the relationship which I have found to exist between the average particle size as expressed in millimeters, against the per cent extraction on a chromite ore.

Figure 2 shows the relationship between the time required for complete reaction against the thickness of the ore bed.

Figure 3 is a diagrammatic view, partly in section, illustrating an apparatus which I have successfully employed.

Figure 4 is a graph illustrating the retort height relative to the temperature maintained.

In working out these methods I have first investigated the effect of particle size upon the extraction by chlorination and sublimation of the chromite ore above mentioned, with the results shown in Fig. 1. The average size represents the arithmetical average of the maximum and minimum particle sizes. For example, material designated as having an average size of 1.24 millimeters is that material which will pass a 10-mesh screen but is retained upon a 20-mesh screen, while material passing a 200-mesh screen is considered as having an average particle size of 0.05 millimeter.

The curve of Figure 1 shows that in order to obtain extractions above 90%, it is necessary that particles smaller than about 0.15 millimeter be used. I have not specified the time required for these extractions to be attained, since, starting with a given quantity of ore, the time is fixed by the rate at which just sufficient chlorine is admitted to supply the stoichiometric requirements, and the excess specified in my copending application. Whether this quantity of chlorine is supplied rapidly or slowly makes only minor differences of the slope of the line of Figure 1, and does not affect the finding that high extraction can be obtained only if all the ore is comminuted to pass at least 100-mesh screen, and preferably is so finely divided that all will pass a 200-mesh screen. While this may seem a surprising result in comparison with various presentations known to the art, it may be explained as due to the hindrance of the chlorination action by the accumulation of unvaporized chlorides, especially magnesium. Thus, in large particles, when a given quantity of reaction has taken place, the accumulation of the non-volatile chlorides in the ore capillaries and on the surface stops the chlorination, but in finer particles, with a greater ratio of surface to mass, a greater amount of chlorination occurs before the proportionate amount of non-volatile chlorides cause cessation of the action, and thus higher extraction ensues.

Having discovered that high extractions can be obtained only if the ores are finely ground, I have then also discovered that if finely ground ore is disposed on the surface of coarse granular carrier particles, so that a film of ore is exposed to the direct action of gases, complete chlorination and sublimation can be obtained in a time period which is virtually a linear function of the film thickness, as is illustrated in Figure 2, and a feasible method of control of chlorination and sublimation is disclosed.

The capillaries or surfaces of the coarse granules serving as carrier particles withdraw the fused non-volatile chlorides from the surface of the ore particles in the film, and thus afford opportunity for substantially complete chlorination and sublimation of volatile constituents. The length of time required for complete reaction is then a direct function of the film thickness.

The manner in which I apply these principles to the continuous countercurrent chlorination of chromite ores will be clear from the following discussion of a specific example.

Having a given sized vertical shaft furnace, of conventional design, and which may be simply a vertical cylindrical retort with a gas exit near or below the center of the heated zone, I first determine the size of coarse carrier particles which will travel smoothly and uninterruptedly through the retort under the influence of gravity. The size of the carrier particles must be great enough to permit easy permeation by ascending gases in the retort, and fine enough to travel smoothly as above stated. Retorts of 2 to 4 inch diameter usually require that the particles be from $\frac{1}{8}$ to $\frac{1}{4}$ inch average size; but in retorts of 6 to 8 inches, particles $\frac{3}{8}$ to $\frac{1}{2}$ inch can be used, and in still larger units carrier particles from $\frac{1}{2}$ to $\frac{3}{4}$ inch average size can be used. Carrier particles of these dimensions are relatively massive compared to the ore.

The material of the carrier particles can be any refractory material inert to the chemical reagents used in the process. I have used quartz, mullite, coke, carbon, and even in some cases ore particles themselves, which latter three fall into the inert class because of large particle size, and in consequence of the action illustrated in Figure 1.

Having determined the correct carrier particle size, I measure the resistance to countercurrent gas flow in the retort when such particles are passing downward under normal gravity flow. In this way I determine that a definitely maximum quantity of chlorine (in the particular example now discussed) can be made to pass at a suitable pressure. In general I prefer to operate with pressure drops of not more than 20 to 25 inches of water gage through the retort, since if high pressures or velocities are used, any fine ore particles accidentally dislodged from the film or the carrier particles by the motion of the column tend to be blown out of the retort before they can be chlorinated, and still higher pressures also may tend to cause excessive "gas channeling", whereby the gases no longer uniformly contact the films on the carrier particles.

Obviously the pressures and flow rates measured will depend on the character, as well as the size of the carrier particles, and also to some extent upon the design of the shaft furnace or retort. Thus, for example, in a simple vertical cylindrical retort 2¼ inches in diameter and with a heated zone of about 20 inches length, I have found the upper limit of desirable gas velocity to be 6 to 8 liters per minute when quartz carrier particles of ¼ in. average size were used. This is stoichiometrically equivalent to 11.0 to 14.8 grams per minute of ore of the composition given above, and with correct chlorine excess. It is apparent that the maximum capacity of a given retort will be fixed by the rate at which chlorine can be supplied, provided however that the ore can so be disposed that this amount of ore per unit time is not beyond the reaction rate limit.

In preparing the coating for the carrier particles, I first intimately mix and grind together the chromite ore and finely divided carbon. While the stoichiometric proportions of carbon to this ore corresponds, as explained in my copending patent application, to 11.6% of the weight of the ore, I have found it preferable to use an excess, corresponding to the use of 14.5 to 16% of the weight of the chromite, in order to ensure rapid reaction rate under conditions existing when the major portion of the chromite has been chlorinated. As stated above the ore particle size after grinding must be less than about 100 mesh, and preferably near 200 mesh.

I then add the finely ground chromite-carbon mix in proportion of 100 to 200 grams to coarse carrier particles, in this example ¼ in. quartz, in proportion of 1000 grams, and tumble, roll, or otherwise agitate or treat the mixture until the fine ore-carbon particles adhere to the carrier particles in the form of a thin uniform film. This action is promoted by the addition before tumbling of small quantities of a liquid volatile wetting agent, as for example, carbon tetrachloride, gasolene, or even water. The surface tension and capillary forces then tend to spread the finely ground ore-carbon mix over the carrier particles with considerable uniformity. In the case of quartz or other carrier particles which have been previously used, there are usually small quantities of residual magnesium chloride adhering, which because of its hygroscopic properties tends to become slightly wet, and cause adherence of the finely ground ore. Even in the completely dry state, the cohesive forces are still sufficient to cause adherence of the fine to the coarse particles to an extent sufficient to form the desired thin coating on the coarse particles. The addition of the wetting agent is therefore by no means a prerequisite, and I have operated successfully without its use, but I have found that its presence facilitates securing a uniform film, and enhances the adherent properties of the film after it has been formed, particularly when small amounts of tarry or waxy materials are present.

The apparent density of ground chromite-carbon mix is near 1.15, whence the film thickness when 100 grams of ore-carbon mix are dispersed on 1000 grams of ¼ in. quartz carrier particles is near 0.25 mm., and for the upper limit of 200 grams fines per kilo of quartz near 0.50 mm. While it is possible to utilize thicker films up to 3 mm. thickness, I have generally found it inadvisable to carry more fines on the quartz particles used than corresponds to an amount of magnesium chloride which can normally be withdrawn from the ore by the capillarity and surface wetting of the quartz particles. This factor is best determined empirically, for each ore and carrier type, since the suitable film thickness under these requirements obviously depends on the percentage of impurities in the ore as well as the nature of the surface of the carrier particles. The term "thin bed", as used herein and in the claims, is employed as referring to ore beds of less than 3 mm. thickness.

In the example given here, with a combined CaO and MgO content of 12.3%, the upper limit is near 125 grams of ore-carbon mix per kilo of ¼ in. quartz. When porous carrier particles such as coke are used, the upper limit will be near 400 grams per kilo of coke, the difference being in part accounted for by the lower apparent density of coke particles, and partly by increased porosity of the latter.

Again referring to Figure 2, it is noted that the film thickness of 0.25 to 0.50 millimeter corresponds to reaction times for complete chlorination of from 50 seconds to 1.5 minutes. I now introduce the carrier particles containing the film layer of fine ore into the retort, countercurrent to an upward stream of chlorine gas, at such a rate that the time of residence of the carrier particles in the reaction zone, which is that part of the retort below the gas exit maintained at 900° C. extending downwards to the point at which the charge leaves the heated zone and cools rapidly, is slightly greater than the reaction times illustrated by Fig. 2. Thus in the specific example of a 2¼ inch retort illustrated above, the gas exit may conveniently and effectively be placed one-quarter of the distance upward from the bottom of the heated zone (20 in. in length), whence the reaction zone is 5 inches in length. If the quartz carrier particles are fed at a rate of 4 to 5 kilos per hour, the rate of travel is about 1 to 2 inches per minute, and the time of residence in the heated zone is slightly over 2 minutes, which is just above the theoretical requirements based on Fig. 2 of 0.8 to 1.5 minutes. In this way it is possible to contact the ore with chlorine continuously and countercurrently, with substantially complete distillation of volatile chlorides, and with the controlled chemical conditions necessary as disclosed in my copending patent application to avoid the formation of lower non-volatile chromium chlorides, and volatilizing substantial portions of the chromium as chromium tetrachloride.

The carrier particles issuing from the bottom or discharge end of the retort contain the unchlorinated residue of the ore, which is essentially silica, and the non-volatile chlorides of lime and magnesia. These latter are readily washed off with water, which also frees the fine siliceous ore residue, and the carrier particles are then superficially dried, and reused for further coating with fine ore. In certain cases the agitation of the particles upon a screen fine enough to retain the quartz carrier, but coarse enough to pass the residue particles, suffices to make a fair separation without the necessity of washing and drying.

The part of the furnace above the gas discharge serves primarily as preheater. While the primary functions of the fine ore film coating of carrier particles are the disposition of physical conditions so that requisite chemical conditions may be maintained, and to withdraw by capillarity from the fine ore particles the liquid non-volatile chlorides which ordinarily cause stoppage of chlorination and low extractions when they are permitted to accumulate in a briquetted or bedded ore body, I also achieve a number of secondary advantages which are of great importance to the possibility of successful continuous operation. These are a. The maintenance of a high relative velocity between ore particles and gas, which results in high diffusing rates of chlorine to ore, and of volatilized chlorides and $CO_2$ away from ore.

b. The provision of means of maintaining the thermal balance of the system during chlorination and sublimation, by utilizing sensible heat stored in the carrier particles.

The importance of the first item will be clear from the following tabulation of the gas densities, and relative diffusion rates of the various gases and vapors in question.

| Gas or vapor | Gas density | Relative diffusion rate |
|---|---|---|
| Air | 1 | 1 |
| Chlorine | 2.4 | 0.6 |
| Carbon dioxide | 1.5 | 0.8 |
| Ferric chloride vapor | 11.2 | 0.3 |
| Chromium trichloride vapor | 5.5 | 0.43 |
| Chromium tetrachloride vapor | 6.5 | 0.39 |

The high densities and low relative diffusion rates of several of the vapors and gases involved in the process cause great difficulties in bringing fresh reacting chlorine to the ore particle, and especially in removing the heavy vapor formed by the chlorination, and this difficulty can be overcome only by ensuring high relative velocity of gas versus ore and carrier particles. If the fine ore were merely contained in the interstices between larger grains, such velocities would cause the fine particles to be blown from the retort before chlorination and be a serious dust problem, as well as the source of low extraction. In a briquetted charge, the heavy vapors can be removed from the interior channels and capillaries of the briquette only with extreme slowness, whence a deficit of chlorine, and an excess of chloride vapors will result, with the inevitable formation of liquid non-volatile lower chlorides, resulting in rapid plugging of the pores, and cessation of the chlorination. Thus, only by disposing the ore in a thin film over which the gases may flow at high relative velocities is it possible to operate continuously, countercurrently, and with high extraction of volatile chlorides.

Regarding the thermal requirements, it is found that the chlorination of chromite ore-carbon mixtures is exothermic if solid or liquid chlorides are formed, and endothermic if the volatile chlorides are formed as vapors, since these chlorides have relatively high heats of vaporization. Thus unless a freely flowing and adequate supply of heat is provided during the chlorination process, there is great tendency and danger for solid chromic chloride to form during the early stages of the countercurrent action, which results in binding of the charge, and stoppage of flow of gases and solids. It will be clear that by my method I am able to utilize the major portion of a retort for preheating, storing sensible heat in the carrier particles, which is freely given up to the ore film by direct contact transmission during the final chlorination period below the gas outlet.

In this connection it may be noted that the addition of a small amount of chlorine added concurrently at the ore feed end of the retort helps to maintain the adhesiveness of the film during the preheating period, since the small amounts of nonvolatile chlorides thus formed will tend to bind the fine ore film to the carrier particles.

In Figure 3 I have shown a diagrammatic representation of an apparatus which I have successfully employed. In this apparatus, a vertical shaft 6 is provided. The shaft is made of inert material as silica, and I have successfully used the material known as Vitreosil. At the upper end of the shaft an ore inlet 7 permits the introduction of the charge, preferably in the form of the aforementioned carrier particles coated with the ore-carbon mixture. Heating means, indicated at 8, provided in the form of electrical resistance, is positioned about a portion of the shaft intermediate the ends thereof. The upper portion of the shaft 6 is continued by a metal extension 32. The joint between the shaft and extension is protected by a surrounding water cooling jacket 9. About 10% of the chlorine is introduced through an inlet 11 placed at the top of the shaft, the remainder being introduced through an inlet 12 adjacent the bottom of the equipment. A thermocouple well 14 extends downwardly into the shaft to below outlet 16 which provides the exit for volatilized materials. Exit 16 is placed above the lower end of the heating zone, to insure that the volatilized chlorides are removed. Usually the exit is placed about a quarter of the zone length above the lower end, for this ensures good results. At the base of the shaft another cooling section 17 is provided, to protect the joint between shaft 6 and a metal base structure 33 and cool the materials which pass therethrough to be removed by discharge conveyers 18 in case 19 at the bottom of the shaft.

Volatilized products pass over through exit 16 into condenser 21. The condenser is also of silica (usually Vitreosil). Volatilized chlorides are condensed in the condenser and scraper 22 permits volatilized chlorides condensing on the side of the condenser to be scraped out into the bottom of the equipment onto plate 23 from which they can be removed by another scraper 24 which serves to remove the condensed chlorides into passage 26. The material collected in the passage 26 is drawn by scraper 24 into receiver 27. Unvolatilized material, dust fines and the like, pass into vessel 28 wherein the gas is filtered through filter bag 29, usually an asbestos filter. A shaker 31 supports the upper end of the bag and this is shaken occasionally so that the collected dust drops down into the receiver 27.

In Figure 4 I have shown the temperature gradient relative to the heighth of the retort. This shows the actual temperature existing in any portion of the equipment under constant operating conditions.

While I have described my invention specifically with reference to a chromite chlorination process, it will be realized that the two secondary advantages described under (a) and (b) are of great advantage in other processes which one may desire to carry out in a shaft type furnace, involving contact of gases with fine ores. An example of such a process is the reduction of finely divided iron ores or oxides by gases. If such gases are in part hydrogenic in character, the process will in general be heat absorbing, and further rapidly flowing contact between fine ore and gases is found to accelerate reduction rates, but such conditions cannot be obtained in continuous countercurrent furnaces by direct feeding of finely ground ore or briquetted charge.

I have further found that my process is not limited to the use of elementary chlorine as chlorinating agent. Thus, instead of disposing mixtures of ore and carbon upon the surface of carrier particles, I may in certain instances prefer to use ore only as the film forming substance, and to supply the reducing agents in gaseous form. The vapors of carbon tetrachloride, or other volatile chlorinated hydrocarbons, may for example be substituted for chlorine, as these supply available chlorine. Volatilized halogens can also be used, including bromine and iodine and their volatile compounds or compounds providing available halogens. In certain instances I may supply hydrocarbon gases and chlorine either as mixtures, or at alternate positions in the retort column. When hydrogen containing materials are thus used, the effluent gases contain hydrochloric acid and water vapor, but the physical principles involved are the same as in my first described method, and equally significant advantages of operation are secured.

I claim:

1. A method of recovering the chromium value in a chromite ore comprising reducing said ore in size to pass a 100 mesh screen, mixing the finely divided ore with carbon and with carrier particles for the ore-carbon mixture, the ore-carbon mixture volume relative to the surface of the carrier particles being such that the mixture is present substantially only as a surface coating on said carrier particles, and subjecting the surface coated carrier particles to a temperature of about 900° C. and to chlorine to chloridize the metal content thereof.

2. The process of continuously chlorinating and volatilizing chromite ores which consists in grinding the ore to at least 100-mesh particle size, mixing said ground ore with a solid carbonaceous reducing material in amounts slightly in excess of stoichiometric carbon requirements, coating the mixture of fine ore and carbonaceous material upon inert carrier particles of a size sufficient to ensure substantially continuous gravity flow through a vertical retort, e. g. in sizes from $\frac{1}{8}$ to $\frac{3}{4}$ inch, by which a film of ore-carbonaceous mixture less than 2 to 3 millimeters thickness is formed upon said carrier particles, and subjecting said coated carrier particles to the countercurrent action of chlorine under controlled conditions of contact so that substantially all volatile chlorides are completely sublimed.

3. The process as in claim 2 in which the ore is an oxidic material containing an element capable of forming a volatilizable chloride.

4. The process as in claim 2 in which a vaporized halogen other than chlorine is employed.

5. The process of reducing or reacting finely divided oxidic ores with gases, which includes coating such ores ground to less than 100-mesh size upon the surface of inert carrier particles of sizes sufficient to ensure substantially gravity flow and thorough gas penetration of said ore through vertical retorts, passing said carrier particles countercurrently to gases under controlled conditions of time and temperature, and removing the film in reduced or altered form from the carrier particles after passage through the retort.

6. A method of forming finely divided chromic chloride comprising reducing a chromite ore to pass a 100 mesh screen, mixing the finely divided ore with carbon and with carrier particles for the ore-carbon mixture, said carrier particles carrying said mix substantially only as a surface coating on said particles of less than about 3 mm. thickness, subjecting said coated carrier particles to chlorine at a chloridization temperature whereby chrome in finely divided ore is converted to finely divided chromic chloride, and separating said chromic chloride from said carrier particles.

7. In a method of preparing chromium ore for conversion to a chromic halide, the steps of reducing said ore in size to pass a 100 mesh screen, and mixing the finely divided ore with carbon and with carrier particles for the ore-carbon mixture, the ore-carbon mixture volume relative to the surface of the carrier particles being such that the mixture is present substantially only as a surface coating on said carrier particles.

8. The process of continuously chlorinating and volatilizing chromite ores which consists in grinding the ore to at least 100-mesh particle size, mixing said ground ore with a solid carbonaceous reducing material, coating the mixture of fine ore and carbonaceous material upon carrier particles of a size sufficient to ensure substantially continuous gravity flow through a vertical retort, e. g. in sizes from $\frac{1}{8}$ to $\frac{3}{4}$ inch, by which a film of ore-carbonaceous mixture less than 3 millimeters thickness is formed upon said carrier particles, and subjecting said coated carrier particles to the countercurrent action of chlorine under controlled conditions of contact so that substantially all volatile chlorides are completely sublimed.

9. The process as in claim 5 in which the oxidic ore is chromite and at least one of the gases is chlorine.

CHARLES G. MAIER.